(12) United States Patent
Shatkin

(10) Patent No.: US 11,304,782 B2
(45) Date of Patent: Apr. 19, 2022

(54) DENTAL RESTORATION SYSTEM FOR INSTALLING BRIDGE PROSTHESES ON MINI DENTAL IMPLANTS

(71) Applicant: Todd E. Shatkin, Williamsville, NY (US)

(72) Inventor: Todd E. Shatkin, Williamsville, NY (US)

(*) Notice: Subject to any disclaimer, the term of this patent is extended or adjusted under 35 U.S.C. 154(b) by 0 days.

(21) Appl. No.: 14/582,488

(22) Filed: Dec. 24, 2014

(65) Prior Publication Data

US 2016/0184057 A1  Jun. 30, 2016

(51) Int. Cl.
  *A61C 8/00* (2006.01)
  *A61C 1/08* (2006.01)
  *A61C 13/265* (2006.01)

(52) U.S. Cl.
  CPC .............. *A61C 8/005* (2013.01); *A61C 1/084* (2013.01); *A61C 8/0022* (2013.01); *A61C 8/0024* (2013.01); *A61C 8/0048* (2013.01); *A61C 8/0075* (2013.01); *A61C 8/0095* (2013.01); *A61C 13/2656* (2013.01)

(58) Field of Classification Search
  CPC ......... A61C 8/005; A61C 8/0024; A61C 8/00; A61C 8/084; A61C 8/0022; A61C 8/0048; A61C 8/0075; A61C 8/0095; A61C 13/2656
  See application file for complete search history.

(56) References Cited

U.S. PATENT DOCUMENTS

| | | |
|---|---|---|
| 3,798,773 A | 3/1974 | Northcutt |
| 4,708,646 A | 11/1987 | Jasper |
| 5,087,202 A | 2/1992 | Krenkel |
| 5,520,540 A * | 5/1996 | Nardi ................ A61C 13/2656 433/172 |
| 5,556,280 A * | 9/1996 | Pelak .................. A61C 8/0048 433/172 |
| 6,719,557 B1 | 4/2004 | Williams |
| 7,090,490 B2 | 8/2006 | Graham et al. |
| 7,108,511 B1 * | 9/2006 | Shatkin ................ A61C 1/084 433/174 |
| 7,329,121 B2 | 2/2008 | De Clerck |

(Continued)

FOREIGN PATENT DOCUMENTS

| | | |
|---|---|---|
| WO | WO2010087824 | 8/2010 |
| WO | 2011069226 A1 | 6/2011 |

(Continued)

OTHER PUBLICATIONS

The International Search Report (ISR) for International (PCT) Application No. PCT/US2015/058911; dated Feb. 15, 2016.

(Continued)

*Primary Examiner* — Yogesh P Patel

(74) *Attorney, Agent, or Firm* — David L. Principe; Phillips Lytle LLP

(57) ABSTRACT

An apparatus for installing a dental prosthesis. The apparatus includes a guide stent having one or more apertures. One or more implants have a tip and an abutment end connected by a body. A bridge prosthesis has one or more bores defined therein. A retaining fixture is disposed in the bore of the prosthesis. The bridge prosthesis is attached to the one or more implants via engagement between the abutment end of the implant and the retaining fixture.

6 Claims, 4 Drawing Sheets

(56) References Cited

U.S. PATENT DOCUMENTS

| | | | |
|---|---|---|---|
| 7,354,270 B2 | 4/2008 | Abolfathi et al. | |
| 8,062,032 B2 | 11/2011 | Bulloch et al. | |
| 8,640,705 B2 | 2/2014 | Kopp | |
| 8,764,445 B1* | 7/2014 | DeLuca | A61C 8/005 433/173 |
| 2006/0172251 A1 | 8/2006 | Voudouris | |
| 2006/0269903 A1* | 11/2006 | Bulard | A61C 8/005 433/174 |
| 2007/0259306 A1 | 11/2007 | Raines et al. | |
| 2009/0032030 A1 | 2/2009 | Callender | |
| 2009/0155745 A1* | 6/2009 | Laux | A61C 8/005 433/174 |
| 2010/0105005 A1* | 4/2010 | Bulloch | A61C 13/2656 433/173 |
| 2012/0171639 A1* | 7/2012 | Berger | A61C 8/0048 433/173 |
| 2012/0264082 A1* | 10/2012 | Segura | A61C 8/0075 433/174 |
| 2014/0057222 A1 | 2/2014 | Kumar | |
| 2015/0250569 A1* | 9/2015 | Frick | A61C 13/0006 433/202.1 |

FOREIGN PATENT DOCUMENTS

| | | | | |
|---|---|---|---|---|
| WO | WO 2011069226 A1 * | 6/2011 | | A61C 8/0048 |
| WO | WO-2011069226 A1 * | 6/2011 | | A61C 13/2656 |

OTHER PUBLICATIONS

The Written Opinion of the searching authority for International (PCT) Application No. PCT/US2015/058911; dated Feb. 15, 2016.

Shatkin and Petrotto; Mini Dental Implants: A Retrospective Analysis of 5640 Implants Place Over a 12-Year Period; A Supplement to Compendium of Continuing Education in Dentistry; vol. 33; Special Issue 3; Sep. 2012; Published by AEGIS Publications, LLC; Newtown, Pennsylvania.

* cited by examiner

DENTAL RESTORATION SYSTEM FOR INSTALLING BRIDGE PROSTHESES ON MINI DENTAL IMPLANTS

TECHNICAL FIELD

The present invention relates generally to the field of oral prostheses, and more particularly to the field of dental implants and bridge prostheses.

BACKGROUND ART

There are many known drawbacks with dentures and especially lower dentures which may present issues related to eating certain foods or speaking when a patient may fear that their lower teeth may begin to "float" in their mouth. Also, because dentures include a prosthetic for both teeth and tissue connected to the teeth, the dentures take up space in the mouth that may be uncomfortable for the wearer and may cause difficulties with speaking and eating. There are also drawbacks to cement retained implant prosthetics due to the fact that cement can go down the tissue and cause problems such as periimplantitis.

BRIEF SUMMARY OF THE INVENTION

With parenthetical reference to the corresponding parts, portions or surfaces of the disclosed embodiment, merely for the purposes of illustration and not by way of limitation, the present invention provides a method for installing a dental prosthesis in a subject. The method includes providing a guide stent (34) having one or more apertures (40). One or more implants (31) are installed in the jawbone (43) of the subject such that the one or more implants (31) are substantially aligned with the one or more apertures (40). The one or more implants (31) have at least one orthogonally protruding abutment end (28). After the implants (31) are installed, the guide stent (34) is removed.

One or more retaining fixtures (74) having an O-ring (75) or other mechanical attachment element disposed therein are provided. Next, the at least one retaining fixture (74) is slid over the abutment end (28) of at least one of the implants (31) to provide a positioned retaining fixture (74).

A bridge prosthesis (22) is provided with a plurality of bores (25) defined therein. The bores (25) are sized to receive the retaining fixture (74). An adhesive is provided inside at least one of the bores (25).

Next, the bridge prosthesis (22) is pressed onto the positioned retaining fixture (74) such that the retaining fixture (74) is permanently seated by means of the adhesive in at least one of the bores (25) in the bridge prosthesis (22). After the adhesive has set, the bridge prosthesis (22) may be detached from the abutment end (28) of the at least one implant (31). After the method has been performed, the bridge prosthesis (22) may be attached to the implants (31) in the patient's jaw to provide an effective prosthetic for dental restoration. The above method may be used for quick installation of a complete or partial bridge prosthesis.

In another aspect, the present invention provides an apparatus for installing a dental prosthesis. The apparatus includes a guide stent (34) having one or more apertures (40). One or more implants (31) have a tip (80) and an abutment end (28).

A bridge prosthesis (22) has one or more bores (25) defined therein. A retaining fixture (74) has an O-ring (75) or other mechanical attachment element attached thereto. The retaining fixture (74) is disposed in the bore (25) in the bridge prosthesis (22). The bridge prosthesis (22) is attached to the one or more implants (31) via frictional engagement between the abutment end (28) of the implant (31) and the O-ring (75) or other mechanical attachment element in the retaining fixture (74).

DESCRIPTION OF THE PREFERRED EMBODIMENTS

Figure 1:
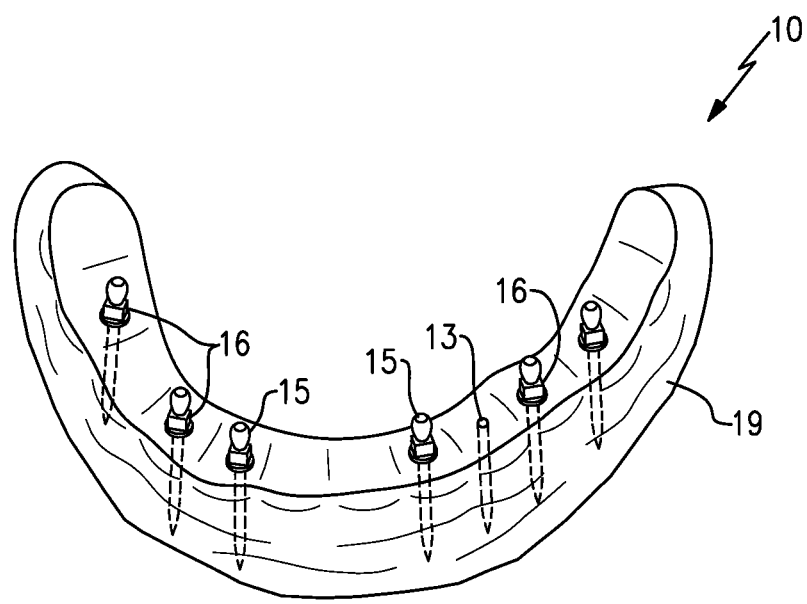
FIG. 1 is a perspective view of a model of the lower jaw of a patient.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or of rotation, as appropriate.

Referring now to the drawings, and more particularly to FIG. 1 thereof, a model 10 for the present invention includes implant orifices or holes 13 that receive a set of implant analogs 16 installed in the lower jaw 19 of the model 10. The implant analogs 16 are similar in size to miniature dental implants but may not include threaded sections as there is no need to tap into the model 10. The implant analogs 16 have a diameter of approximately 1.5 to 4 mm. The implant analogs 16 on the model 10 provide support for a bridge prosthesis 22 (FIG. 5). The bridge prosthesis 22 may be constructed of porcelain, zirconium or other materials as known to persons of skill in the art. The bridge prosthesis 22 may comprise a complete bridge or a partial bridge. The bridge prosthesis 22 includes teeth structures only and does not include any structure for surrounding tissue. As described in greater detail herein, the bridge prosthesis 22 includes a plurality of bores 25 (best shown in FIG. 7) for receiving the abutment end 28 of mini dental implants 31.

Figure 2:
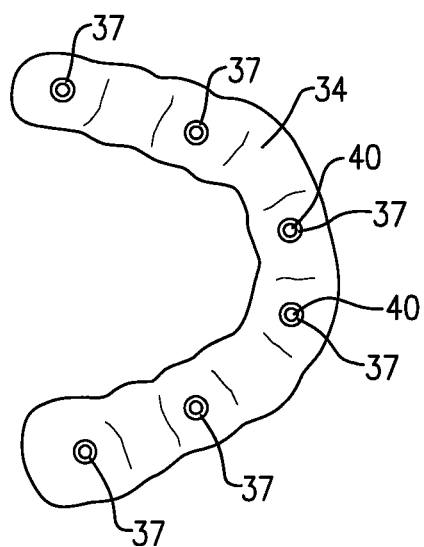
FIG. 2 is a top plan view of a stent for use with the system of the present invention.

Turning to FIG. 2, a stent 34 is made from any suitable thermoplastic material capable of vacuum forming over model 10. The vacuum process acts to mold stent 34 into the shape of the implant receiving area comprising a gap and implant analogs 16 (and surrounding teeth in the case of a partial bridge). In a preferred embodiment of the stent 34 forming procedure, cylinders 37 are placed around implant analogs 16 and into holes 13 so that the cylindrical wall of the cylinders 37 surround the shaft of the implant analogs 16 with the abutment end 15 of implant analog 16 remaining uncovered. With cylinders 37 in place, the vacuum forming process incorporates cylinders 37 into molded stent 34 creating guide holes 40 as part of molded stent 34. FIG. 2 is a top plan view of stent 34, with incorporated guide holes 40, which is molded to the shape of the area of a patient's jaw where implants 31 are to be placed.

Figure 3:
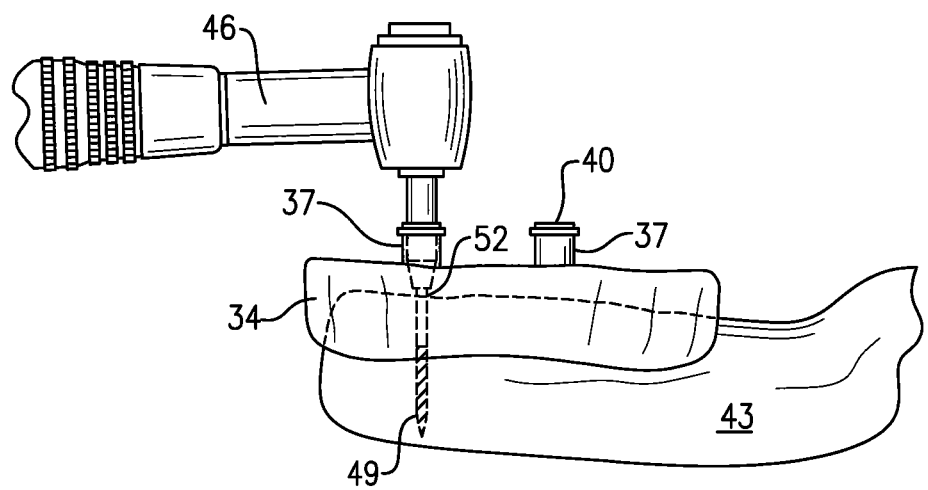
FIG. 3 is a side view depicting the preparation for placement of the implant of the present invention in a lower jaw.

Turning to FIG. 3, to insert implants 31 into the lower jaw 43, the molded stent 34 is placed over the gums where the implants 31 are to be inserted. As a result of the vacuum forming process described above, the configuration of molded stent 34 enables it to fit or overlay snugly on the gum tissues of the patients lower jaw 43. Also, the guide holes 40 are positioned over the gum tissues at predetermined locations analogous to the positions of the implant analogs 16 on the model 10. Moreover, the incorporation of cylinders 37 into stent 34 orients guide holes 40 into the desired angle for inserting implants 31 into the bone material of the patient's jaw 43.

The implant 31 is inserted into bone material below the gum line of the area where the bridge prosthesis 22 is being installed. After using a local anesthetic to desensitize the area, drill 46 with drill bit 49 is used to prepare a starter hole 52 by positioning drill bit 49 through guide hole 40 and drilling through the gum and about 4-8 mm into the underlying bone. By drilling through guide holes 40, the operator and patient are assured that the starter hole 52 is placed at the desired location and is drilled at the desired angle to ensure, as much as possible, that the starter hole 52 is surrounded by bone material of equal mass on the buccal and lingual sides and on the mesial and distal sides respectively. Drill bit 49 has a smaller diameter than that of the implants 31.

Figure 4:
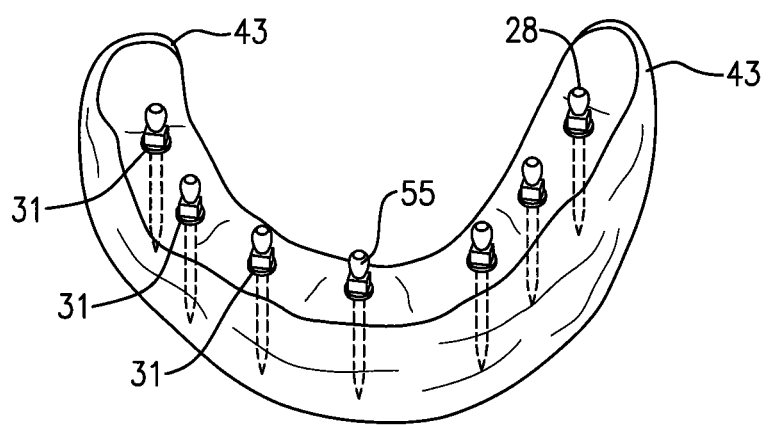
FIG. 4 is a front perspective view of the implants of the present invention embedded in the lower jaw.
Figure 6:
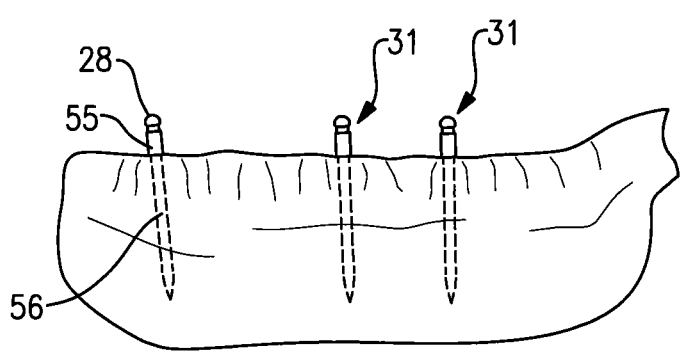
FIG. 6 is a side elevational view of the implants of the present invention embedded in the lower jaw.

Turning to FIG. 4, after preparing the starter holes 52, implants 31 are threaded or screwed into the starter holes 52 until carrier section 55 contacts the gum line of the gap. Wrenches, ratchets, and similar tools may be used to screw implants 31 into the bone material. FIG. 6 depicts a side view of the implants 31 after insertion into the lower jaw 43.

In FIG. 4, the lower jaw 43 of a patient is shown after installation of mini dental implants 31. As shown, the patient is provided with seven implants 31 to be used with a complete bridge prosthesis 22. The implants 31 are disposed in spaced apart relation along the gums of the lower jaw 43 of the patient. Between six and eight implants 31 may be used for a typical restoration. The implants 31 are permanently attached to the lower jaw 43 and act like the root of a normal tooth. A side view of the implants 31 is shown in FIG. 6. As shown a threaded section 56 is disposed beneath the gum line and the carrier section 55 extends from the gum line to a short distance above the gum line at the base of the abutment end 28.

Figure 5A:
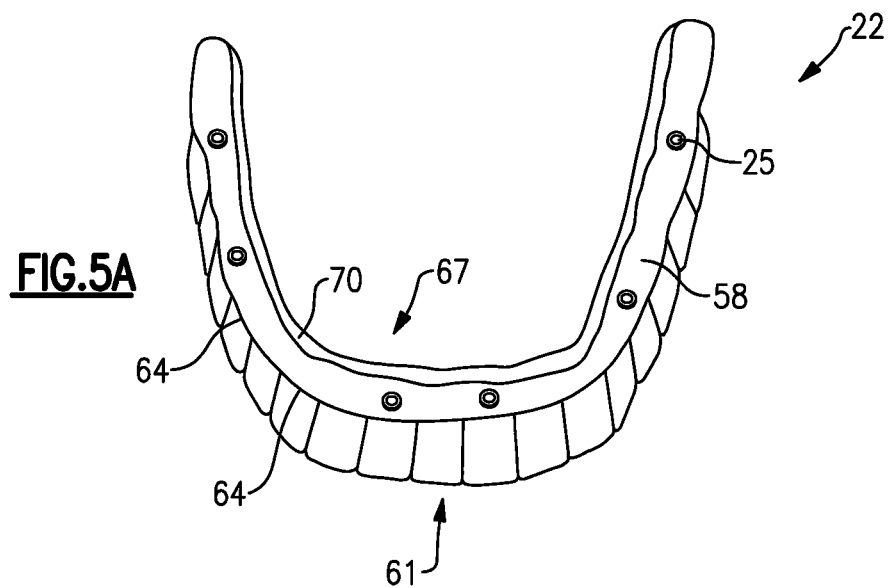
FIG. 5A is a bottom perspective view of a full bridge prosthesis of the present invention.
Figure 5B:
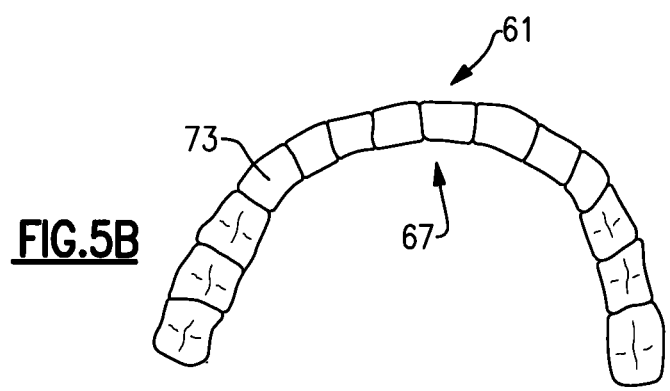
FIG. 5B is a top plan view of the prosthesis shown in FIG. 5A.

In FIG. 5A, a complete bridge prosthesis 22 may be constructed from any material used in the manufacture of tooth prostheses. Preferably suitable resins, porcelain, porcelain fused to metal combination, zirconium or other materials having properties suitable for dental restoration prostheses may be used as will be known to those of ordinary skill in the art based on this disclosure. The bridge prosthesis 22 includes a bottom surface 58 having a plurality of bores 25 disposed therein. The bores 25 align with the implants 31 for attachment of the bridge prosthesis 22 to the lower jaw 43 of the patient. The bridge prosthesis 22 has an outer surface 61 that is formed to provide the appearance of a plurality of individual teeth. The outer surface 61 terminates in a front edge 64 that directly contacts the gums on the lower jaw 43 when the bridge prosthesis is installed. The bridge prosthesis 22 also includes an inner surface 67 that is formed in the shape of a plurality of teeth. The inner surface also terminates in an edge 70 that directly contacts the gums when the bridge prosthesis 22 is installed. The top surface 73 (FIG. 5B) of the bridge prosthesis 22 is formed in the shape of a plurality of teeth and includes shapes corresponding to incisor teeth and molars. The bores 25 are sized to receive retaining fixtures 74 and O-rings 75 as described herein.

Figure 7:
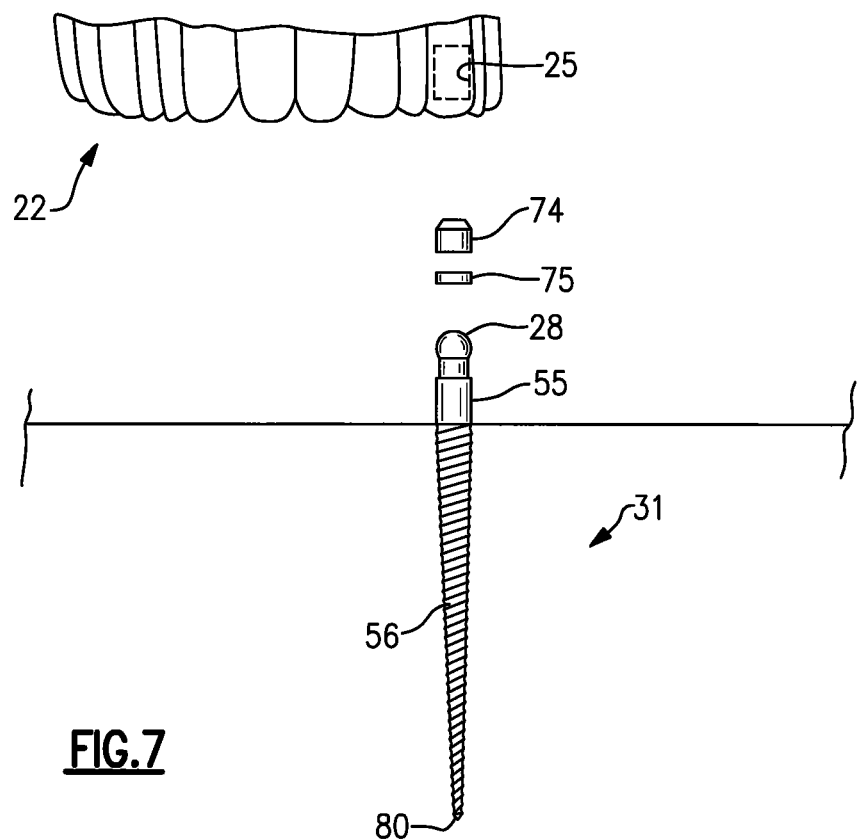
FIG. 7 is an exploded front elevation view showing the components of the system.

Turning to FIG. 7, a single implant 31 is shown for clarity. Implant 31 is a shaft ranging in diameter from approximately 1.8 mm to 4.0 mm. In one example, the diameter may be 1.8-2.5 mm depending on the density of the bone material that will support implant 31. The implants 31 may be modified to include one or more materials such as osteoinductive agents, bone graft material, bone substitute material, allograft bone, demineralized bone material, ceramics, coral, collagen and ceramic composite, ossified bone protein, an osteogenesis source, a fusion promoting substance, a bone growth promoting material, bone, bone derived substances, a demineralized bone matrix, a mineralizing protein, hydroxyapatite, or genes coding for the production of bone.

Threaded section 56 extends from tip 80 to carrier section 55. Tip 80 has a point sufficient to enable implant 31 to be self-tapping when it is inserted into lower jawbone 43 or the upper jawbone. Carrier section 55 is configured in such a way as to allow instruments such as suitably sized wrenches, ratchets or similar tools to grab and turn implant 31 in order to screw implant 31 into bone material. Abutment end 28 is configured to be inserted into the retaining fixture 74 in the bridge prosthesis 22. Abutment end 28 may have any shape including a spherical shape as shown. Other shapes may be suitable depending on the shape of the opening in the retaining fixture 74.

The O-ring 75 fits inside the retaining fixture 74 and provides for frictionally engaging the abutment end 28 of the dental implant 31 with the retaining fixture 74. The O-ring 75, retaining fixture 74, and dental implant 31 are sized such that the frictional fit between the abutment end 28 of the implant 31 and the O-ring 75 in the retaining fixture 74 is strong enough to hold the bridge prosthesis 22 securely against the gums of the patient, but allows for separation of the bridge prosthesis 22 from the implants 31 by a dental professional. Accordingly, the bridge prosthesis 22 is not permanently attached to the gums of the patient, but is detachable by a dental professional, with the use of tools, for inspection and cleaning during a dental visit. The detachable feature of the bridge prosthesis 22 provides many advantages. The bridge prosthesis 22 is not typically removed by the patient. The prosthesis 22 may be removed by the dentist for recall visits and cleanings.

In order to prepare the bridge prosthesis 22, retaining fixtures 74 with O-rings 75 disposed inside may be mounted on the abutment end 28 of the implant 31. Next, the bridge prosthesis 22 is provided with an adhesive inside the bore 25. The bridge prosthesis 22 is then pressed onto the retaining fixture 74 (which is already mounted on the implants) such that the retaining fixture 74 is received and permanently attached inside the bore 25 by means of the adhesive. The adhesive may comprise a dental cement or the like as will be evident to those of ordinary skill in the art based on this disclosure.

While the retaining fixture 74 and O-ring 75 provide one example of a mechanical attachment for the abutment end 28 of the dental implant 31, it will be evident to those of ordinary skill in the art based on this disclosure that other mechanical attachments such as male/female connectors, plastic snap connectors, or the like may also be suitable.

Figure 8:
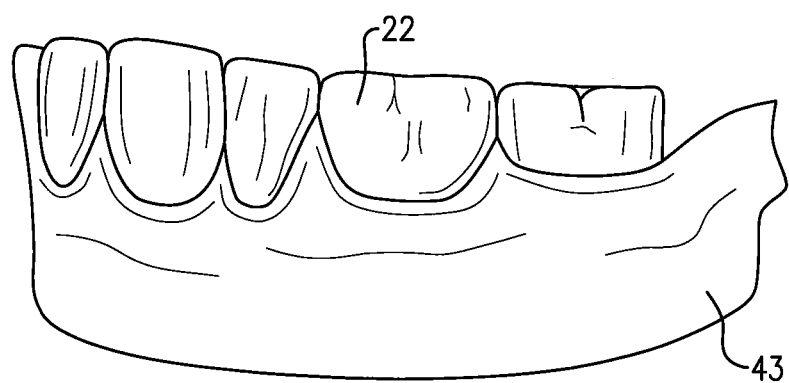
FIG. 8 is a side elevational view showing the bridge prosthesis installed on the lower jaw.

Turning to FIG. 8, the bridge prosthesis 22 has been installed on the lower jaw 43 of a patient. The bridge prosthesis 22 contains structures only corresponding to teeth and fits directly onto the gum tissue of the lower jaw of the patient. The bridge prosthesis 22 is held securely in position by the frictional fit between the abutment end 28 and the O-ring 75 inside the retaining fixture 74. The bridge prosthesis 22 may be detached by a dental professional as necessary by inserting a tool between the bridge prosthesis 22 and the gum line of the patient and prying the prosthesis 22 away from the implants 31.

The present invention contemplates that many changes and modifications may be made. Therefore, while the presently-preferred form of the dental restoration system has been shown and described, and several modifications and alternatives discussed, persons skilled in this art will readily appreciate that various additional changes and modifications may be made without departing from the spirit of the invention, as defined and differentiated by the following claims.

What is claimed is:

1. An apparatus for installing a dental prosthesis comprising:
   (a) one or more mini dental implants, wherein each of the one or more mini dental implants has a tip and an abutment end connected by a body, the abutment end having a spherical shape;
   (b) a preformed multiple tooth prosthesis corresponding to teeth structure only and having no structure corresponding to gum tissue, the multiple tooth prosthesis having a first surface formed to provide the appearance of a plurality of individual teeth, the multiple tooth prosthesis having a second surface with one or more bores defined therein; and
   (c) a hollow mechanical attachment having an O-ring disposed therein, the mechanical attachment disposed in the one or more bores in the multiple tooth prosthesis, the mechanical attachment having a curved interior surface configured and arranged to receive the abutment end of the mini dental implant to attach the multiple tooth prosthesis to the one or more mini dental implants;
   (d) wherein the multiple tooth prosthesis is held in position only by frictional engagement of the abutment end of the one or more mini dental implants inside the mechanical attachment in the one or more bores and is detachable from the one or more mini dental implants;
   (e) wherein the apparatus is configured such that the abutment ends of the one or more mini dental implants bear substantially all of the downward forces on the mini dental implant from mastication.

2. The apparatus of claim 1, further comprising a guide stent having one or more apertures, the guide stent being composed of a thermoplastic material configured as a topological imprint formed by vacuum imprinting, and wherein the guide stent functions to direct the positioning of one or more threaded anchors through the one or more apertures.

3. The apparatus of claim 1 wherein the one or more implants comprise one or more osteoinductive agents, bone graft material, bone substitute material, allograft bone, demineralized bone material, ceramic, coral, collagen and ceramic composite, ossified bone protein, a source of osteogenesis, a fusion promoting substance, a bone growth promoting material, bone, bone derived substances, a demineralized bone matrix, a mineralizing protein, a plasma spray coating, an ossifying protein, bone morphogenetic protein, hydroxyapatite, or genes coding for the production of bone.

4. A system for installing a dental prosthesis in a subject, the system comprising:
   (a) a guide stent having one or more apertures, wherein the guide stent is composed of a thermoplastic material configured as a topological imprint formed by vacuum imprinting;
   (b) one or more mini dental implants for installation in the subject's jaw such that the one or more mini dental implants are aligned with the one or more apertures, wherein the one or more implants have a tip and an abutment end connected by a body, the abutment end having a spherical shape;
   (c) preformed multiple tooth prosthesis corresponding to teeth structure only and having no structure corresponding to gum tissue, the multiple tooth prosthesis having a first surface formed to provide the appearance of a plurality of individual teeth, the multiple tooth prosthesis configured to attach to the one or more mini dental implants, the multiple tooth prosthesis having a second surface with one or more bores defined therein; and
   (d) a hollow mechanical attachment having an O-ring disposed therein, the mechanical attachment disposed in the one or more bores in the multiple tooth prosthesis, the mechanical attachment having a curved interior surface configured and arranged to receive the abutment end of the mini dental implant to attach the multiple tooth prosthesis to the implant;
   (e) wherein the multiple tooth prosthesis is held in position only by frictional engagement of the abutment end of the one or more mini dental implants inside—the mechanical attachment in the one or more bores and is detachable from the implant;
   (f) wherein the apparatus is configured such that the abutment ends of the one or more mini dental implants bear substantially all of the downward forces on the mini dental implant from mastication.

5. The system of claim 4, wherein the one or more implants comprise one or more osteoinductive agents, bone graft material, bone substitute material, allograft bone, demineralized bone material, ceramic, coral, collagen and ceramic composite, bone protein, a source of osteogenesis, a fusion promoting substance, a bone growth promoting material, bone, bone derived substances, a demineralized bone matrix, a mineralizing protein, a plasma spray coating, an ossifying protein, bone morphogenetic protein, hydroxyapatite, or genes coding for the production of bone.

6. The system of claim 4, wherein the one or more implants include a threaded section, a carrier section, and a self-tapping thread extending to a tip.

* * * * *